Sept. 27, 1949.   R. W. KOPPRASCH   2,483,013
COMBINATION SLINGER SPACER
Filed Nov. 4, 1947

INVENTOR.
ROBERT W. KOPPRASCH
BY
James and Franklin
ATTORNEYS

Patented Sept. 27, 1949

2,483,013

UNITED STATES PATENT OFFICE 2,483,013

COMBINATION SLINGER SPACER

Robert W. Kopprasch, St. Albans, N. Y., assignor to Eastern Air Devices, Inc., Brooklyn, N. Y., a corporation of New York Application November 4, 1947, Serial No. 783,951

12 Claims. (Cl. 171—206)

This invention relates to electric motors and other rotating machines, and more particularly to an improved combination slinger spacer for the same.

Heretofore one popular form of electric motor has been made with a shaft carrying a stack of laminations, and with bearings carrying said shaft well outside said laminations. The space between the laminations and the bearings has been filled by sleeve-like spacers surrounding the shaft and bearing at their inner ends against the laminations, and at their outer ends against the bearings.

This has necessitated a large tolerance in the axial dimension between the ends of the spacers, compared to the axial dimension between the bearings, the reason for this being that the stack of laminations may vary somewhat in thickness because of minute variations in the thickness of the individual laminations, and minute deviations from perfect flatness of some of the laminations.

The primary object of the present invention is to overcome this difficulty, and to make a spacer arrangement which is inexpensive, and easily assembled, yet accurate in axial dimension, and independent of the laminations on the rotor.

To accomplish the foregoing general object, and other more specific objects which will hereinafter appear, my invention resides in the combination slinger spacer mechanism and the elements thereof, as are more particularly described in the following specification. The specification is accompanied by a drawing wherein.

Figure 1:
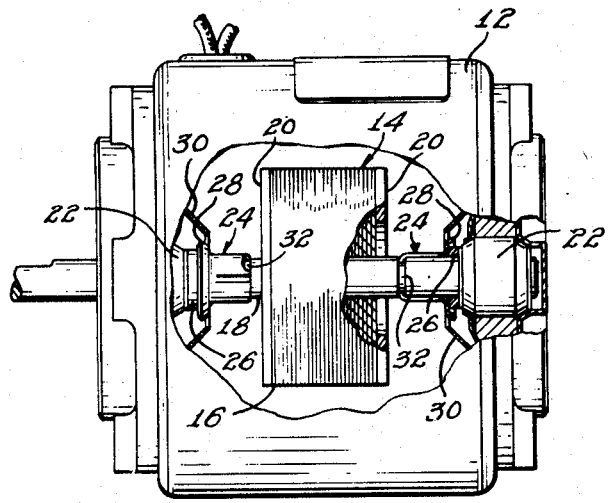
Fig. 1 is a partially sectioned elevation of a motor embodying the combination slinger spacers of my invention.

Referring to the drawing, and more particularly Fig. 1, the invention is there shown applied to a small motor of relatively inexpensive type, the said motor comprising a stator 12 and a rotor 14. The rotor comprises a stack of ferrous laminations 16 secured on a shaft 18. The windings are of the squirrel cage type and in accordance with modern practice are die cast in the laminations, there being bars, not shown, connected at each end by integrally cast rings 20.

The shaft 18 is carried by bearings 22 which in turn are secured in the ends of the stator housing. The axial space between the stack of laminations 16 and the bearings 22 is taken up by means of spacers 24. The outer ends of the spacers bear against rings 26 which in turn abut the bearings 22. This limits axial movement of the shaft.

The outer ends of the spacers 24 are flanged outwardly to form oil slingers 28. The ends of the stator housing have frusto-conical walls 30 which trap any oil slung outwardly by the slingers 28, and which return the oil to the bearings.

In accordance with past practice in the manufacture of this class of motor, the spacers 24 were sleeve-like members which extended all the way from the laminations 16 to the bearings. In other words, the inner ends of the spacer sleeves would abut the outermost laminations. Because of variations in thickness of the laminations, the over-all axial dimension between the outer ends of the spacers could not be held to close tolerance.

Now in accordance with the present invention, the spacers are located independently of the laminations. They are located with relation to grooves 32, which are cut into the shaft during manufacture of the shaft, and are spaced apart by a precise amount.

Figure 4:
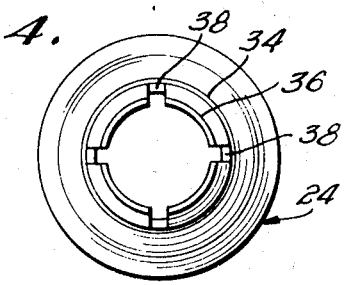
Fig. 4 is an end view of a slinger spacer before being applied to the shaft.
Figure 5:
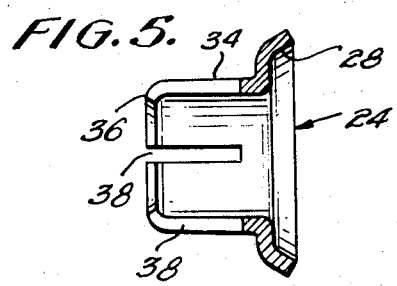
Fig. 5 is a section taken in the plane of the line 5—5 of Fig. 4.

One preferred shape for the combined slinger spacer is shown in Figs. 4 and 5. There is a generally cylindrical or sleeve like portion 34 which is spun inwardly to somewhat smaller diameter at one end 36. The cylindrical or sleeve like portion is slit longitudinally with a plurality of slits 38 which make the inwardly spun edge 36 resiliently expansible. The opposite end of the sleeve is flared outwardly to provide the slinger flange 28 previously referred to.

Figure 2:
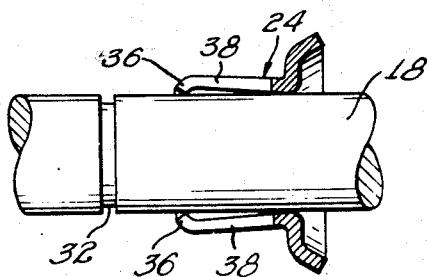
Fig. 2 is a section drawn to enlarged scale, showing the application of the slinger spacer to the shaft.
Figure 3:
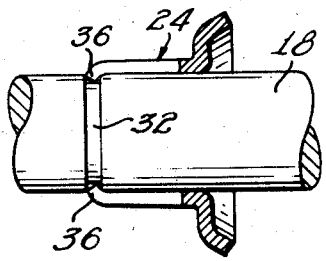
Fig. 3 shows the slinger spacer in position on the shaft.

The manner in which the slinger spacer may be applied to the shaft will be clear from examination of Figs. 2 and 3. In Fig. 2 the slinger spacer 24 is being slid axially along shaft 18. The slits 38 permit the inturned edge 36 to spread outwardly enough to receive the shaft 18. When the slinger spacer has been moved along the shaft as far as the groove 32, the edge 36 snaps into the groove as shown in Fig. 3, and accurately locates the spacer on the shaft.

It is believed that the construction of my improved slinger spacer, as well as the advantages thereof, will be apparent from the foregoing detailed description. The spacers hold the rotor against axial movement and the tolerance may be kept quite close because the location of the spacers is wholly independent of the ferrous laminations of the rotor. At the same time the manner in which the spacers are located on the shaft is almost as inexpensive as the previous method using spacers which bear against the laminations. There is no increased labor cost for assembling the spacers on the rotor, it being necessary merely to slide the same along the shaft until they spring into mating the grooves.

The oil slinger portions catch any oil flowing inwardly from the bearing along the shaft, and return it to the bearing.

It will be apparent that while I have shown and described my invention in a preferred form, changes may be made in the structure disclosed, without departing from the spirit of the invention as sought to be defined in the following claims.

I claim:

1. A rotor comprising a shaft of uniform diameter, a pair of spaced small grooves in said shaft, bearings for said shaft located a substantial distance from said grooves, and generally tubular spacers disposed around the shaft between the grooves and the bearings to fill the space therebetween, said grooves being accurately spaced from one another along the shaft, and one end of each spacer being received and held against axial movement by one of said grooves.

2. A rotor for use in electrical apparatus, said rotor comprising a shaft, a stack of laminatios on said shaft, the portions of said shaft outside said laminations being of uniform diameter, grooves in said uniform diameter shaft portions outside said laminations, bearings for said uniform diameter shaft portions located a substantial distance outside said grooves, and spacers disposed between the grooves and the bearings to fill the space therebetween, said grooves being accurately spaced from one another along the shaft independently of the axial thickness of the stack of laminations, and said spacers having mating parts received and held against axial movement by said grooves.

3. A rotor for use in an electric motor, said rotor comprising a shaft, a stack of laminations on said shaft, the portions of said shaft outside said laminations being of uniform diameter, grooves in said uniform diameter shaft portions outside said laminations, bearings for said uniform diameter shaft portions located a substantial distance outside said grooves, and spacers disposed between the grooves and the bearings to fill the space therebetween, said grooves being accurately spaced from one another along the shaft independently of the axial thickness of the stack of laminations, and the inner ends of said spacers being received and held against axial movement by said grooves.

4. A rotor as defined in claim 1, in which the spacers are made of relatively resilient sheet metal, and include a generally cylindrical hub portion extending axially of the shaft, said hub portion being longitudinally slit with a plurality of slits to make the same resiliently expansible, and the inner end of said hub portion being spun inwardly to provide a part which is received by the groove.

5. A rotor as defined in claim 1, in which the spacers have integrally formed oil slingers at their outer ends.

6. A rotor as defined in claim 2, in which the spacers have integrally formed oil slingers at their outer ends.

7. A rotor as defined in claim 3, in which the outer ends of the spacers are outwardly flanged to trap oil moving inwardly along the shaft from the bearing, and to throw the same outwardly, thereby acting as oil slingers.

8. A rotor as defined in claim 1, in which the spacers are made of relatively resilient sheet metal, and include a generaly cylindrical hub portion extending axially of the shaft, said hub portion being longitudinally slit with a plurality of slits to make the same resiliently expansible, and the inner end of said hub portion being spun inwardly to provide a part which is received by the groove, and in which the outer ends of the spacers are outwardly flanged to trap oil moving inwardly along the shaft from the bearing and to throw the same outwardly, thereby acting as oil slingers.

9. A rotor for use in electrical apparatus, said rotor comprising a shaft, a stack of laminations on said shaft, grooves in said shaft outside said laminations, bearings for said shaft outside said grooves, and spacers disposed between the grooves and the bearings to fill the space therebetween, said grooves being accurately spaced from one another along the shaft independently of the axial thickness of the stack of laminations, said spacers being made of relatively resilient sheet metal and including a generally cylindrical hub portion extending axially of the shaft, said hub portion being longitudinally slit with a plurality of slits to make the same resiliently expansible, and the inner end of said hub portion being spun inwardly to provide a part which is snugly received by the groove.

10. A rotor for use in an electric motor, said rotor comprising a shaft, a stack of laminations on said shaft, grooves in said shaft outside said laminations, bearings for said shaft outside said grooves, and spacers disposed between the grooves and the bearings to fill the space therebetween, said grooves being accurately spaced from one another along the shaft independently of the axial thickness of the stack of laminations, said spacers being made of relatively resilient sheet metal and including a generally cylindrical hub portion extending axially of the shaft, said hub portion being longitudinally slit with a plurality of slits to make the same resiliently expansible, and the inner end of said hub portion being spun inwardly to provide a part which is accurately received by the groove.

11. A rotor for use in electrical apparatus, said rotor comprising a shaft, a stack of laminations on said shaft, grooves in said shaft outside said laminations, bearings for said shaft outside said grooves, and spacers disposed between the grooves and the bearings to fill the space therebetween, said grooves being accurately spaced from one another along the shaft independently of the axial thickness of the stack of laminations, said spacers being made of relatively resilient sheet metal and including a generally cylindrical hub portion extending axially of the shaft, said hub portion being longitudinally slit with a plurality of slits to make the same resiliently expansible, the inner end of said hub portion being spun inwardly to provide a part which is snugly received by the groove, and the outer ends of said spacers being outwardly flanged to trap oil moving inwardly along the shaft from the bearing and to throw the same outwardly, thereby acting as oil slingers.

12. A rotor for use in an electric motor, said rotor comprising a shaft, a stack of laminations on said shaft, grooves in said shaft outside said laminations, bearings for said shaft outside said grooves, and spacers disposed between the grooves and the bearings to fill the space therebetween, said grooves being accurately spaced from one another along the shaft independently of the axial thickness of the stack of laminations, said spacers being made of relatively resilient sheet metal and including a generally cylindrical hub portion extending axially of the shaft, said hub portion being longitudinally slit with a plurality of slits to make the same resiliently expansible, the inner end of said hub portion being spun inwardly to provide a part which is accurately received by the groove, and the outer ends of said spacers being outwardly flanged to trap oil moving inwardly along the shaft from the bearing and to hrow the same outwardly, thereby acting as oil lingers.

ROBERT W. KOPPRASCH.

REFERENCES CITED

The following references are of record in the file of this patent:

UNITED STATES PATENTS

| Number | Name | Date |
| --- | --- | --- |
| 1,965,718 | Wiley | July 10, 1934 |
| 2,122,085 | Castricone | June 28, 1938 |
| 2,136,301 | Hoddy et al. | Nov. 8, 1938 |